June 29, 1937.  V. K. ZWORYKIN  2,085,406
ELECTRICAL DEVICE
Filed Aug. 31, 1933    2 Sheets-Sheet 1

INVENTOR:
Vladimir K. Zworykin,
BY
HIS ATTORNEY.

June 29, 1937.　　　V. K. ZWORYKIN　　　2,085,406
ELECTRICAL DEVICE
Filed Aug. 31, 1933　　　2 Sheets-Sheet 2
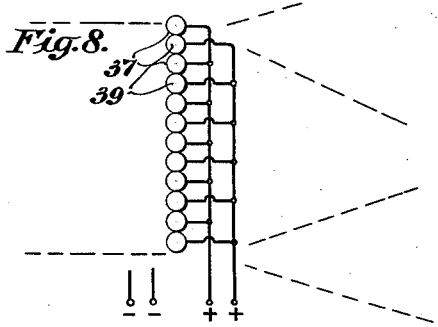
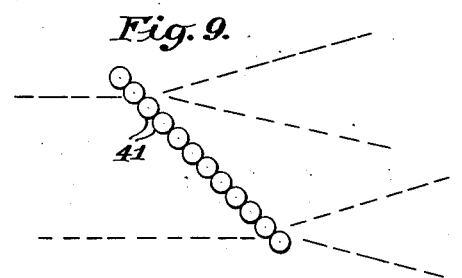
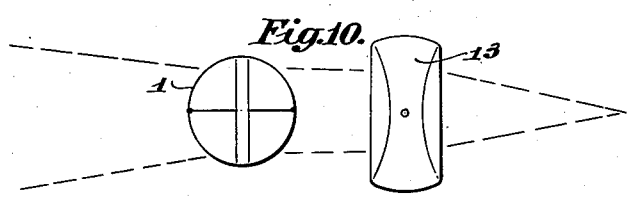
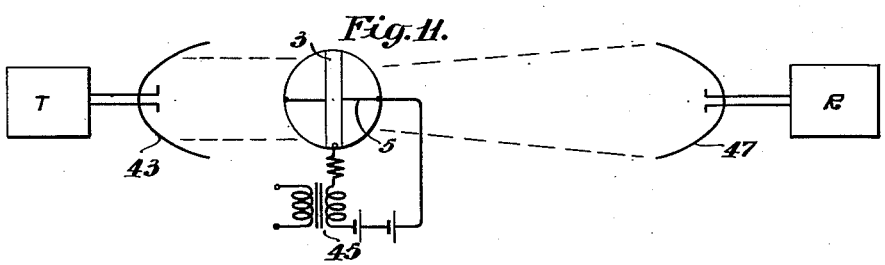
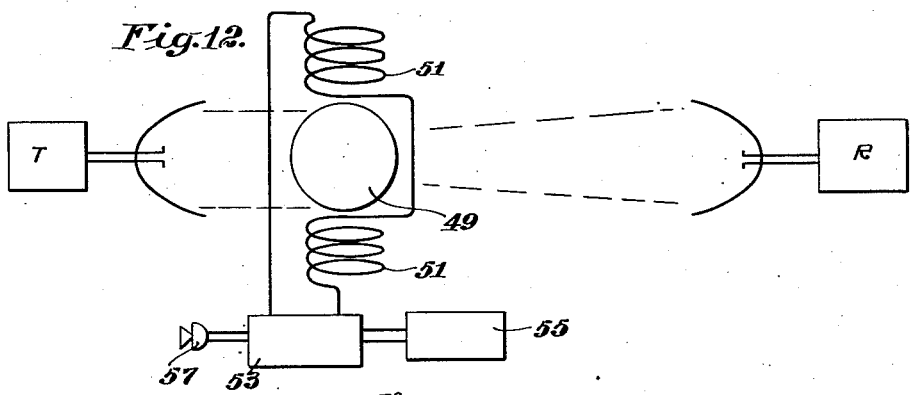
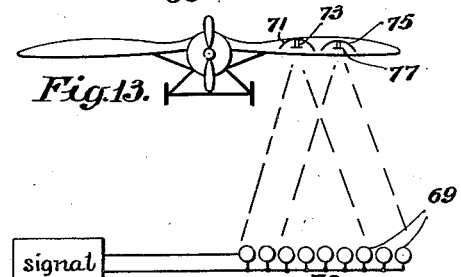
INVENTOR:
Vladimir K. Zworykin,
BY [signature]
HIS ATTORNEY.

Patented June 29, 1937

2,085,406

UNITED STATES PATENT OFFICE 2,085,406

ELECTRICAL DEVICE

Vladimir K. Zworykin, Philadelphia, Pa., assignor to Radio Corporation of America, a corporation of Delaware Application August 31, 1933, Serial No. 687,575

16 Claims. (Cl. 250—11)

My invention relates to radio devices and particularly to such devices as lenses and the like for focusing, reflecting, or otherwise acting upon radio energy.

It is well known that radio energy having a short wave length (of the order of 10 centimeters, for example) can be focused, reflected, dispersed, etc. much the same as light by utilizing lenses, prisms, or the like, made of a proper material such as paraffin.

An object of my invention is to provide devices of the above mentioned type which will be efficient in operation and comparatively cheap to manufacture.

A further object of my invention is to provide devices of the above mentioned type having quasi-optical properties which can be controlled in accordance with a voltage.

More specifically, an object of my invention is to provide ionized gas or space-charge devices for causing radio energy to be refracted, dispersed, reflected, and the like.

Other features and advantages of my invention will appear from the following description taken in connection with the accompanying drawings, in which Figure 1 is a side view of a lens constructed in accordance with my invention and designed to diverge a radio beam;

Figs. 7 and 8 are views of diffraction gratings utilizing the elements shown in Fig. 5;

Fig. 9 is a view of a refracting device utilizing the elements shown in Fig. 5;

Fig. 10 illustrates a lens system utilizing the lenses shown in Figs. 1 and 2;

Figs. 11 and 12 show modulating systems employing different forms of my lenses; and Fig. 13 is a view illustrating one of the uses for my improved devices.

Figure 1:
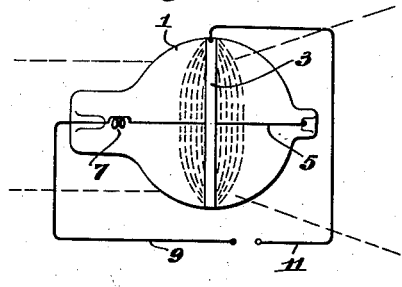

The embodiment of my invention illustrated in Fig. 1 comprises an envelope 1 which is approximately spherical in form and which is filled with a gas which can be readily ionized. One electrode of the device consists of a metal band 3 in the form of a circle painted or deposited in any suitable manner upon the inside of the glass envelope 1.

The other electrode consists of a wire 5 extending at right angles to the plane of the ring electrode 3 and through the middle of the ring. The electrode 5 is held taut by means of a spring 7. Either a steady or a varying potential may be impressed upon the electrodes 3 and 5 through the conductors 9 and 11, depending upon whether a fixed or varying lens action is desired.

By using a suitable gas at the proper pressure, a region of gas inside the envelope 1 will be ionized, this region having the shape indicated by the dotted lines. By preference the pressure should be such that the ionized glow will be of the uniform type found in that region called the positive column. This characteristic discharge is well known to those skilled in the art; it is found at gas pressures varying from several tenths of a millimeter to several centimeters of mercury. It will be evident that these dotted lines indicate the distribution of the electric field inside the container, and, since it is the region within this electric field which is ionized, the dotted lines also indicate the portion of the gas which is ionized. The electrodes are shaped and positioned to produce an electrostatic field of shape corresponding to the required lens action.

It will be seen that this portion of ionized gas is in the shape of a disc which is thick in the middle and thin at the edge. Since ionized gas has an index of refraction which is less than unity for the radio waves, such waves will travel through the center of this gas lens more rapidly than through air, and the radio beam will be diverged by the lens.

Various gases or gas mixtures may be used in my lens but in general, one of the noble gases, such as neon, or a mixture of such gases, will be preferred.

The gas pressure may vary within wide limits, but preferably it should be low enough so that the ionized region of the gas will be uniformly ionized. Under this condition, it will be apparent that the lens properties of the device shown in Fig. 1 will depend mainly upon the shape of the ionized gas region.

From the foregoing description it will be understood that the lens properties of the device shown in Fig. 1 are substantially independent of the shape of the envelope 1, the effective lens shape being determined by the distribution of the electric field.

Figure 2:
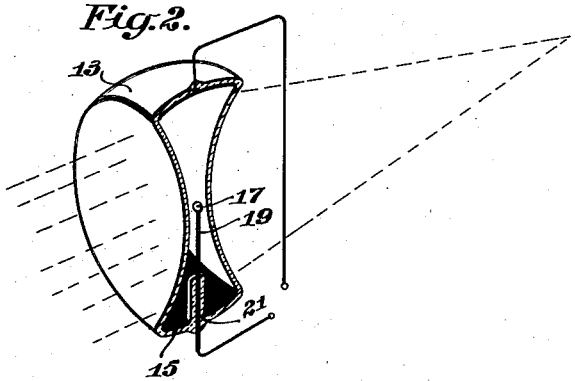
Fig. 2 is a perspective view taken on cross-section of another lens constructed in accordance with my invention, but designed to cause a radio beam to converge.

In Fig. 2 there is illustrated an electrical lens designed to converge a beam of radio energy. It comprises a disc shape envelope 13 which is thicker at the edges than at the middle. One electrode comprises a ring 15 of metal painted or otherwise deposited upon the inner surface of the envelope 13 at the outer thick edge. Preferably, the ring electrode 15 is of approximately the same width as the edge of the envelope 13. The other electrode is in the form of a ball 17 positioned at the center of the envelope 13 and supported from a rod 19 fastened in a press 21.

The converging lens of Fig. 2 utilizes the same gases at substantially the same pressure as the diverging lens of Fig. 1. In the case of the specific form of converging lens illustrated, however, the lens action does depend to a large extent upon the shape of the container 13 since the container restricts the region of ionization because of the negative charges which appear on the glass wall of the container during ionization. As indicated in Fig. 2, the ionized portion of the gas completely fills the container 13, the particular shape of this ionized region being determined largely by the shape of the container walls and the negative charges thereon.

Figure 3:
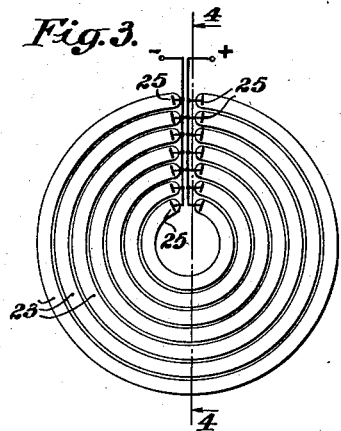
Fig. 3 is a view of a modified form of a lens embodying my invention.

Fig. 3 shows a form of lens utilizing a plurality of circular gas-filled tubes 23. Each tube has two electrodes 25 therein, one at each end of the tube, for impressing an ionizing potential upon the gas. This form of lens may be made either converging or diverging by changing the intensity of the discharge in each tube 23.

If a diverging lens is desired, the intensity of the discharge in the outer tube will be made greater than that in any of the other tubes. The intensity of discharge will be graduated from a heavy discharge in the outer tube, through a diminishing discharge in the intermediate tubes, to a small discharge in the center tube. If a converging lens is desired, the discharge in the center tube will be made the heaviest, and the discharge in the outer tube the smallest.

Figure 4:
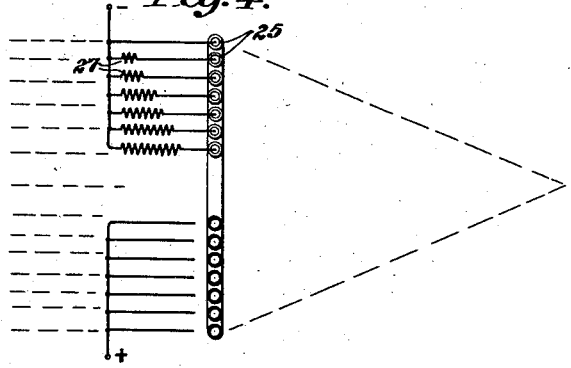
Fig. 4 is a view taken on the line of 4—4 looking in the direction of the arrows.

Fig. 4 indicates how the degree of discharge or ionization in the different tubes 23 may be adjusted. All the tubes may be connected in parallel, as shown, each tube having a different value of resistance in series with it. Thus, as shown in Fig. 4, the outer tube is connected directly across a voltage source, and the next tubes have resistance units 27 of increasing value in series with them, the center tube having the largest value of resistance in series with it so that the ionization discharge in this tube will be small.

Figure 5:
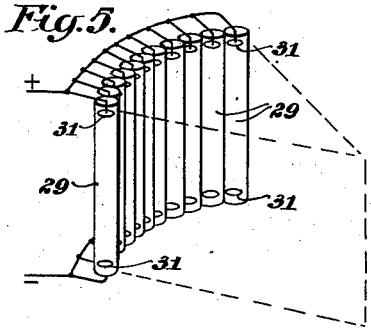
Fig. 5 is a view of one embodiment of my invention designed for reflecting a radio beam.

Fig. 5 illustrates a cylindrical mirror comprising a plurality of gas-filled tubes 29, each tube having an electrode 31 at each end. When the gas in tubes 29 is ionized, they will act as a mirror to reflect any radio energy striking them. They may be designed to focus the parallel rays of a radio beam, as indicated in the figure.

Figure 6:
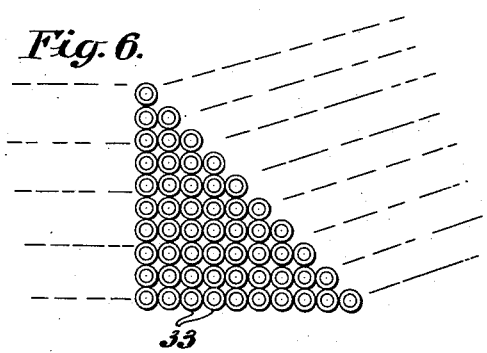
Fig. 6 is an end view of a prism constructed of the elements shown in Fig. 5.

Fig. 6 shows how a prism may be built up of a plurality of tubes 33 of the type illustrated in Fig. 5. These tubes may be connected either in parallel or in series, as desired.

Figure 7:
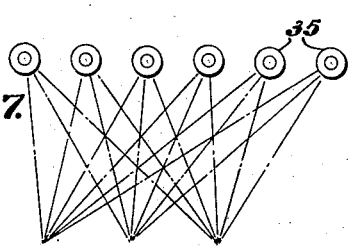

Fig. 7 is an end view of a diffraction grating made up of a plurality of elements 35, spaced apart the correct distance, a half wave length, for example. Elements 35 may be the same as tubes 29 shown in Fig. 5.

Fig. 8 shows a diffraction grating consisting of two sets of elements 37 and 39, the intensity of discharge in elements 37 being different than the intensity of discharge in the elements 39. Each set of elements comprises a diffraction grating and since the intensity of discharge is different in the two diffraction gratings, the beam is diffracted different amounts by the two gratings, that is, the radio beam is split into two components oscillating in phase.

Fig. 9 illustrates a prism made up of elements 41 constructed the same as the tubes shown in Fig. 5. Each tube 41 has an intensity of discharge which is different than that of the other tubes, and these intensities of discharge are graduated in the manner described in connection with Fig. 3.

The above described optical units may be combined in various ways to form the desired lens system. For example, the lenses shown in Figs. 1 and 2 may be be combined as illustrated in Fig. 10.

Many uses will be found for my electrical lenses. Figs. 11 and 12 illustrate systems for modulating a radio beam. In Fig. 11 my lens shown in Fig. 1 is placed in front of the parabolic reflector 43 of a radio beam transmitter to intercept the radio beam. The modulating voltage is applied across the electrodes 3 and 5 of the lens so that the amount that the radio beam is diverged is varied is accordance with a modulating voltage supplied through transformer 45. Since the amount of energy reaching the parabolic reflector 47 of the receiver depends upon the amount that the beam is diverged, the received energy will be modulated by the signal.

A different type of lens is shown in Fig. 12 for modulating a radio beam. It comprises a spherical envelope 49 filled with a readily ionizable gas. Radio frequency coils 51 are placed on each side of the spherical envelope 49 and supplied with modulated radio frequency energy from a modulator 53 which is connected to an oscillator 55 and a source of modulating current 57.

Fig. 13 illustrates a signaling device 70 for airplanes or the like. A group of gas-filled tubes 69 such as shown in Fig. 5 are connected in parallel and supplied with an ionizing voltage modulated by an identifying signal. This group of tubes is located on or near the earth at a point where an airplane pilot may wish to determine his position. For example, the device may be placed at one corner of a landing field.

The airplane will carry means for transmitting and receiving a radio beam. In Fig. 13 there is shown a transmitting reflector 71 with its dipole antenna 73 and a receiving reflector 75 with a receiving dipole antenna 77. To locate the corner of the landing field, a radio beam will be transmitted from reflector 71. This beam will be reflected from the ground and received by reflector 75. If the airplane passes over the device 70, the reflected beam will be modulated by the identifying signal and the pilot will then know his exact position.

The same apparatus may be employed for locating and identifying ships in the dark or in a fog. The modulating device 70 will be placed on a side of a ship and on the outside so that a radio beam reflected from the side of the ship will pass through device 70 and be modulated by a signal identifying the ship.

It will be understood that a portion of the radio beam will be reflected from the modulating device itself instead of from the earth. This portion of the beam also will be modulated since both the absorbing ability and the reflecting ability of the tubes will vary with the degree of ionization.

Various other modifications may be made in my invention without departing from the spirit and scope thereof, and I desire, therefore, that only such limitations shall be placed thereon as are necessitated by the prior art and set forth in the appended claims.

I claim as my invention:

1. A device for refracting ultra high radio frequency energy, said device comprising means for producing a region of free electric charges, means for distributing said charges in said region, and means for transmitting said energy through said region, whereby said energy is differentially impeded.

2. A device for refracting ultra high radio frequency energy, said device comprising means for confining a gas, and electrodes shaped and arranged for ionizing said gas in portions of different intensities, whereby energy passing through said different portions is differentially retarded.

3. A lens for ultra high radio frequency energy comprising means for confining gas, and electrodes shaped and arranged for ionizing said gas in accordance with the desired lens shape.

4. A lens for ultra high radio frequency energy comprising means for confining gas, and means for ionizing said gas, and means for radiating said energy through the central portion of the gas and the outer portion of the gas, whereby it is differentially impeded.

5. A lens for ultra high radio frequency energy comprising a gas-filled container and electrodes arranged and polarized for ionizing said gas in portions having the characteristics of a lens.

6. A lens for ultra high radio frequency energy comprising a gas-filled container and electrodes disposed and shaped for producing an ionized portion of said gas having a lens shape.

7. An electrical lens for ultra high radio frequency energy comprising means for producing a region of free electric charges, means dividing said region into a central portion and an outer portion, each portion having a materially different number of free charges whereby said energy is differently attenuated in said different portions.

8. An electrical lens for ultra high radio frequency energy comprising means for producing a region of ionized gas, means dividing said region into a central portion and an outer portion, in which portions there is a material difference in the number of free charges whereby said energy is differently attenuated in said different portions.

9. An electrical lens for ultra high radio frequency energy comprising means for producing a region of uniformly ionized gas, electrodes shaped and disposed for proportioning said region into a central portion and an outer portion, said two portions being of different thickness whereby said energy is differently attenuated in said different portions.

10. An electrical lens for ultra high radio frequency energy comprising means for producing a region of free electric charges, and electrodes positioned and shaped for causing said charges to assume a lens shape whereby said energy may be focused.

11. An electrical lens for ultra high radio frequency energy comprising means for producing a region of free electric charges, and electrodes disposed and shaped for producing in said region an electric field having a lens shape so that said energy may be refracted in said lens.

12. An electrical lens for ultra high radio frequency energy comprising a gas-filled container, and electrodes shaped and disposed for producing an ionizing electric field therein having a lens shape, said gas having a pressure such that the ionization caused by said field is substantially uniform throughout whereby said lens refracts said energy.

13. In combination, means for producing and directing ultra high radio frequency energy and a device for acting upon said energy, said device comprising a container filled with gas, and means for maintaining at least a portion of said gas ionized and disposed in the shape of a lens, said container being placed in the path of said energy.

14. An electrical lens for ultra high radio frequency waves comprising a plurality of substantially circular electric discharge tubes concentrically arranged with respect to each other, means for determining the number of free electric charges in a unit length of discharge tube the number of said free electric charges being graduated from the center tube to the outside tube.

15. An electrical lens for ultra high radio frequency waves comprising a plurality of substantially circular electric discharge tubes concentrically arranged with respect to each other, and means for maintaining discharges of different intensity in said tubes, the intensity of discharge being graduated from the center tube to the outside tube.

16. In combination, means for producing and directing energy at an ultra high radio frequency and an energy modifying device interposed in the path of said energy, characterized in that the device is constituted by at least one container enclosing a substantially infinite number of free electric charges disposed in the shape of a lens.

VLADIMIR K. ZWORYKIN.